(12) United States Patent
Kwon (10) Patent No.: US 8,537,220 B2
(45) Date of Patent: Sep. 17, 2013

(54) SURVEILLANCE CAMERA HAVING LENS CONTROLLER WATERPROOFING MEMBER

(75) Inventor: Hyuk Sub Kwon, Seoul (KR)

(73) Assignee: KT&C Co., Ltd, Seoul (KR)

( * ) Notice: Subject to any disclaimer, the term of this patent is extended or adjusted under 35 U.S.C. 154(b) by 499 days.

(21) Appl. No.: 12/944,264

(22) Filed: Nov. 11, 2010

(65) Prior Publication Data

US 2012/0120235 A1     May 17, 2012

(51) Int. Cl.
    *H04N 7/18*     (2006.01)
(52) U.S. Cl.
    USPC ......................................................... 348/143
(58) Field of Classification Search
    USPC ......................................................... 348/143
    See application file for complete search history.

(56) References Cited

U.S. PATENT DOCUMENTS 4,585,313 A * 4/1986 Iwata et al. .................... 359/696
7,815,379 B2 * 10/2010 Sato ............................... 396/427

* cited by examiner

*Primary Examiner* — Tung Vo
*Assistant Examiner* — Obafemi Sosanya
(74) *Attorney, Agent, or Firm* — Greer, Burns & Crain, Ltd.

(57) ABSTRACT

A surveillance camera has waterproofing members detachably fitted into guide holes for focus control and zoom control. The camera has a lens controller waterproofing member, a focus controller and a zoom controller and includes a housing having a first guide hole and a second guide hole; a first rod fixing part combined with the focus controller outer surface and including a first extended part with a first rod fitting hole; a second rod fixing part combined with the outer surface of the zoom controller and including a second extended part with a second rod fitting hole; first and second waterproofing members sealing the first and second guide holes; a focus control rod fastened through the first waterproofing member; and a zoom control rod fastened through the second waterproofing member.

5 Claims, 6 Drawing Sheets

SURVEILLANCE CAMERA HAVING LENS CONTROLLER WATERPROOFING MEMBER

BACKGROUND OF THE INVENTION

1. Field of the Invention

The present invention relates to a surveillance camera having a lens controller waterproofing member and, more particularly, to a surveillance camera having a lens controller waterproofing member, which includes waterproofing members detachably fitted into guide holes for focus control and zoom control so as to easily perform focus control and zoom control outside a housing of the surveillance camera and protect the inside of the surveillance camera from rainwater and dust to improve the life of the surveillance camera.

2. Background of the Related Art

A surveillance camera is a device used for crime prevention not only in places requiring high-level security, such as department stores and banks, but also in conventional houses. The surveillance camera is widely used since it can perform around-the-clock surveillance at low costs.

The surveillance camera is set up in a specific place or location according to purpose and focus and zoom positions are set according to a position requiring surveillance. To achieve this, a focus controller and a zoom controller are included in the camera body.

When the focus controller and the zoom controller are included in the camera body, however, the camera body has to be disassembled whenever it is required to change focus and zoom states, which takes a long time.

To solve this problem, there has been developed a surveillance camera which has focus and zoom controllers fitted with adjusting rods and guide holes formed in an external housing such that the adjusting rods are protruded to the outside through the guide holes, to thereby control focus and zoom without disassembling the camera body.

In this surveillance camera capable of controlling focus and zoom from the outside, however, rainwater, moisture or dust may penetrate into the camera through the guide holes formed in the housing to reduce the life of the surveillance camera.

SUMMARY

Accordingly, the present invention has been made in view of the above-mentioned problems occurring in the prior art, and it is a primary object of the present invention to provide a surveillance camera with a lens controller waterproofing member, which is constructed in such a manner that a waterproofing member composed of a contact cover and a frame lever is adjusted to seal a guide hole formed in the outer surface of a housing to protect components inside the housing from rainwater, moisture or dust to thereby extend the life of a surveillance camera.

To accomplish the above object of the present invention, according to the present invention, there is provided a surveillance camera with a lens controller waterproofing member, which has a focus controller 240 and a zoom controller 260, comprising a housing 100 having a first guide hole 110 and a second guide hole 120 formed in the outer surface thereof; a first rod fixing part 310 combined with the outer surface of the focus controller 240 and including a first extended part 312 with a first rod fitting hole 318, which is formed at the bottom thereof; a second rod fixing part 410 combined with the outer surface of the zoom controller 250 and including a second extended part 412 with a second rod fitting hole 418, which is formed at the bottom thereof; a first waterproofing member sealing the first guide hole 110; a second waterproofing member sealing the second guide hole 120; a focus control rod 320 having a body inserted into the first guide hole 110 and screwed through the first waterproofing member 350 and an end fitted in the first rod fitting hole 318 formed in the first extended part 312 of the first rod fixing part 310; and a zoom control rod 420 having a body inserted into the second guide hole 120 and screwed through the second waterproofing member 450 and an end fitted in the second rod fitting hole 418 formed in the second extended part 412 of the second rod fixing part 410.

The housing 100 may include a first mounting groove 130 in which the first waterproofing member 350 is mounted and a second mounting groove 140 in which the second waterproofing member 450 is mounted, which are formed on the inner face of the housing 100.

The first and second waterproofing members 350 and 450 may respectively comprise contact covers 330 and 430 in a round shape corresponding to the first and second mounting grooves 130 and 140 formed on the inner face of the housing 100, the cross sections of the contact covers 330 and 430 having a hollowed shape with the top partially cut, the contact covers 330 and 430 having screw combining insertion holes 335 formed at the centers thereof; and frame levers 340 and 440 having a cross section corresponding to the cross section of the contact covers 330 and 430 and including ']'-shaped cover parts 342 and 442 formed at both ends of the frame levers 340 and 440 to support both ends and parts of the top of the contact covers 330 and 430 and screw combining parts 344 and 444 formed at the centers of the frame levers 340 and 440.

The contact covers 330 and 430 may be made of rubber or silicon and the frame levers 340 and 440 may be made of plastic.

The first and second rod fixing parts 310 and 410 may include a plurality of brackets 500 supporting the first and second waterproofing members 350 and 450.

According to the surveillance camera having a lens controller waterproofing member according to the present invention, the lens controller can be effectively sealed to protect the inside of the housing from rainwater or dust so as to maintain the performance of the surveillance camera and extend the life of the surveillance camera.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
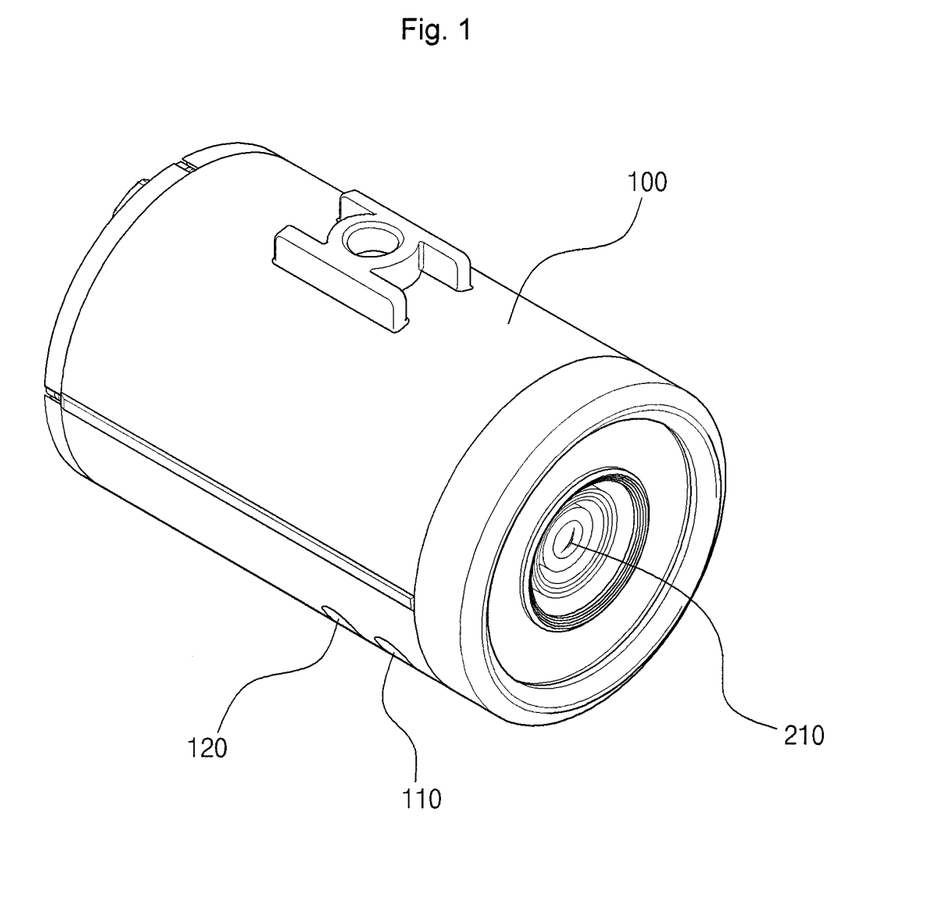
FIG. 1 is a perspective view of a surveillance camera according to an embodiment of the present invention.
Figure 2:
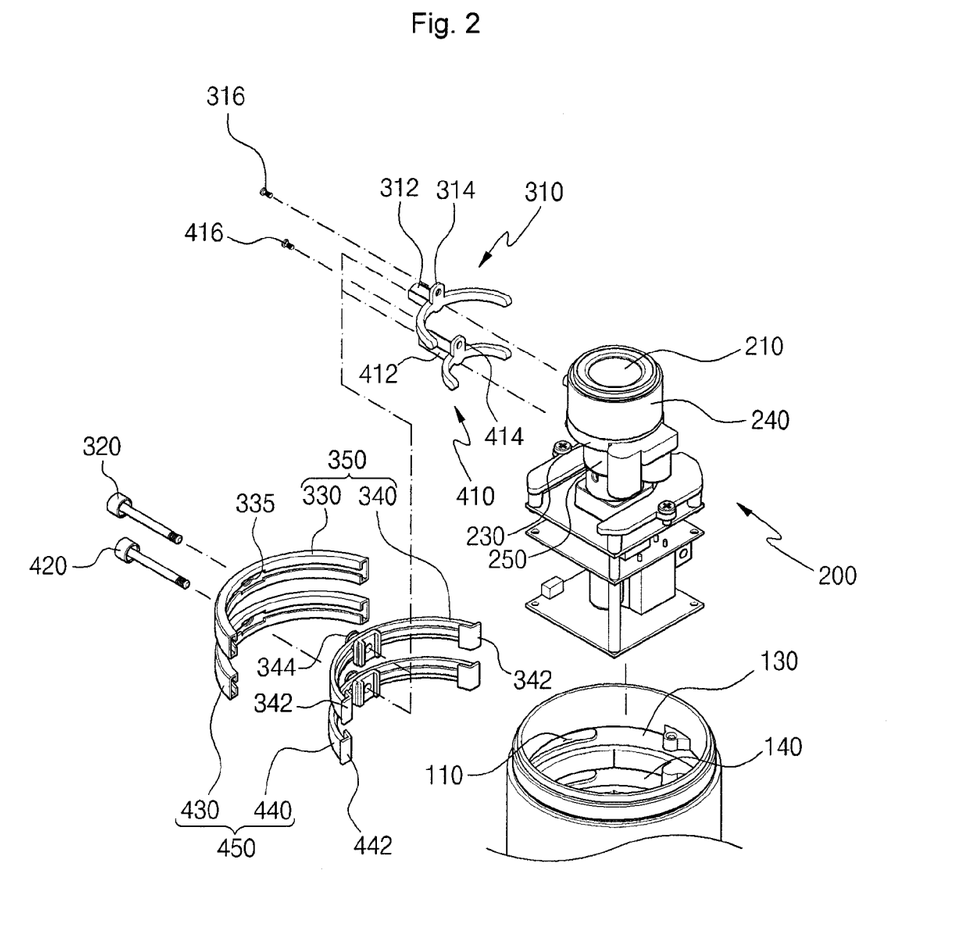
FIG. 2 is an exploded perspective view of parts of the surveillance camera shown in FIG. 1.
Figure 3:
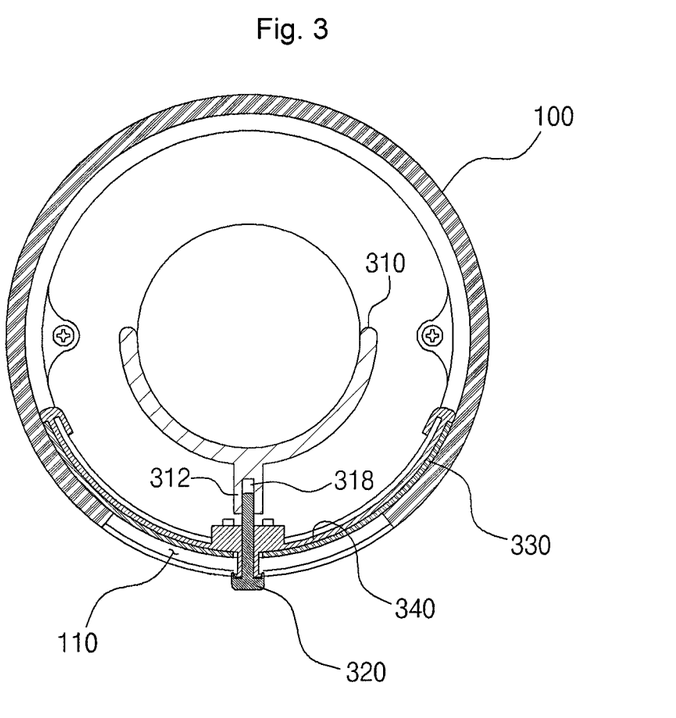
FIG. 3 is a cross-sectional view of the surveillance camera shown in FIG. 1, taken from the front of the surveillance camera.
Figure 4:
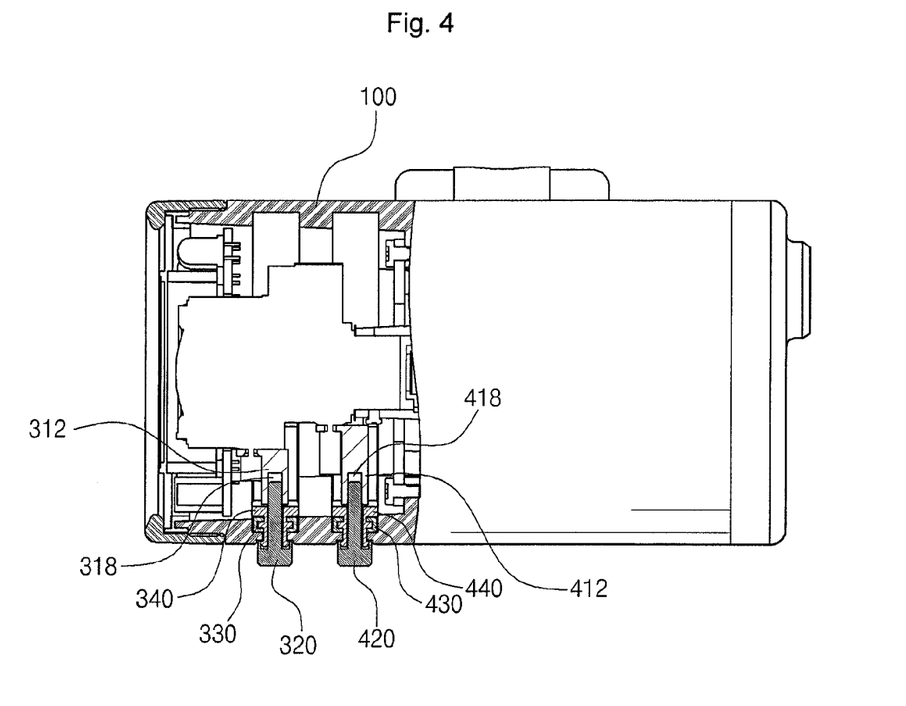
FIG. 4 is a cross-sectional view of the surveillance camera shown in FIG. 1, taken from the side of the surveillance camera.

FIG. 1 is a perspective view of a surveillance camera according to an embodiment of the present invention and FIG. 2 is an exploded perspective view of parts of the surveillance camera shown in FIG. 1. FIG. 3 is a cross-sectional view of the surveillance camera shown in FIG. 1, taken from the front of the surveillance camera, and FIG. 4 is a cross-sectional view of the surveillance camera shown in FIG. 1, taken from the side of the surveillance camera;

Referring to FIGS. 1, 2, 3 and 4, the surveillance camera having a lens controller waterproofing member includes a housing 100, a lens unit 200, a first rod fixing part 310, a second rod fixing part 410, a focus control rod 320, a zoom control rod 420, a first waterproofing member 350, and a second waterproofing member 450.

The housing 100 is an outer case of the surveillance camera and has components required to photograph objects inside. A first guide hole 110 and a second guide hole 120 are formed in the outer surface of the housing 100 along the circumference. The first and second guide holes 110 and 120 are formed in positions respectively corresponding to the focus control rod 320 and the zoom control rod 420 which will be explained later.

The first and second guide holes 110 and 120 guide the movement of the focus control rod 320 and the zoom control rod 420. The width of the first and second guide holes 110 and 120 is slightly greater than the thickness of the focus control rod 320 and the zoom control rod 420 such that the focus control rod 320 and the zoom control rod 420 can smoothly move in the first and second guide holes 110 and 120. In addition, the first and second guide holes 110 and 120 have a length required for the focus control rod 320 and the zoom control rod 420 to move along focus and zoom ranges.

First and second mounting grooves 130 and 140 in which the first and second waterproofing members 350 and 450 for sealing the first and second guide holes 110 and 120 are respectively mounted are formed on at portions of the inner side of the housing 100, which correspond to the first and second guide holes 110 and 120. The width of the first and second mounting grooves 130 and 140 is greater than at least the width of the first and second guide holes 110 and 120 and equal to or slightly larger than the width of the first and second waterproofing members 350 and 450, which will be explained later, such that the first and second waterproofing members 350 and 450 mounted in the first and second mounting grooves 130 and 140 can cover the first and second guide holes 110 and 120.

The lens unit 200 is a means for photographing an object and includes an imaging lens 210 and a lens mount 230 on which the imaging lens 210 is mounted. The lens mount 230 includes a focus controller 240 and a zoom controller 250.

The focus controller 240 controls the focus of the imaging lens 210. When the focus controller 240 is rotated to one side or the other side, the imaging lens 210 moves forward or backward to control an image formed on a charge-coupled device (CCD) to be dim or distinct. A female screw part combined with the first rod fixing part 310 is formed at a predetermined portion of the outer surface of the focus controller 240.

The first rod fixing part 310 is fixed to a selected portion of the outer surface of the focus controller 240 such that the focus control rod 320 combined with a first extended part 312 of the first rod fixing part 310 is located in the first guide hole 110 formed in the outer surface of the housing 100.

The top of the first rod fixing part 310 has a round shape corresponding to the outer face of the focus controller 240 such that the first rod fixing part 310 can be easily tightly combined with the outer face of the focus controller 240 and the first extended part 312 with a first rod fitting hole 318 in which the focus control rod 320 is fitted is formed at the bottom of the first rod fixing part 310 to form a Y shape. In addition, a first fixing part 314 is formed at the side of the first rod fixing part 310, and thus a first fixing screw 316 for combining the first rod fixing part 310 with the focus controller 240 using a screw penetrates the first fixing part 314.

The first rod fixing part 310 may be formed of a metal material having sufficient strength such that the first rod fixing part 310 is not deformed or damaged by an external force generated when the focus control rod 320 is operated. Preferably, the first rod fixing part 310 is made of aluminum resistant to corrosion. The operation of the focus control rod 320 will be described in detail later.

The first rod fixing part 310 constructed as above is fixed to the focus controller 240 in such a manner that the first fixing screw 316 penetrates the first fixing part 314 and is combined with the female screw part formed on the outer face of the focus controller 240.

The zoom controller 250 controls the distance of the imaging lens 210 to magnify or reduce an object. When the zoom controller 250 is rotated to one side or the other side, the imaging lens 210 moves forward or backward to control the size of an image input to the CCD. A female screw part (not shown) combined with the second rod fixing part 410 is formed at a portion of the outer face of the zoom controller 250.

The second rod fixing part 410 is fixed to a selected portion of the outer surface of the zoom controller 250 such that the zoom control rod 420 connected with a second extended part 412 of the second rod fixing part 410 can be located in the second guide hole 120 formed in the outer surface of the housing 100.

The second rod fixing part 410 has a shape similar to the first rod fixing part 310. Specifically, the top of the second rod fixing part 410 has a shape corresponding to the outer surface of the zoom controller 250 such that the second rod fixing part 410 can be easily tightly combined with the zoom controller 250, the second extended part 412 with a second rod fitting hole 418 is formed at the bottom of the second rod fixing part 410, and a second fixing part 414 is formed at the side of the second rod fixing part 410.

The second rod fixing part 410 constructed as above is fixed to the outer surface of the zoom controller 250 in such a manner that a second fixing screw 416 penetrates the second fixing part 414 and is combined with the female screw part formed on the outer surface of the zoom controller 250.

The focus control rod 320 is a member in a bolt shape and is composed of a head projected to the outside of the first guide hole 110 to allow a user to easily rotate the focus control rod 320 and a body that is extended from the head and has a male screw thread formed thereon. The body is inserted into the first guide hole 110 formed in the outer surface of the housing 100 and screwed through the first waterproofing member 350. The end of the body is fitted in the first rod fitting hole 318 formed in the first extended part 312 of the first rod fixing part 310.

The focus control rod 320 may be formed of a metal material having sufficient strength against an external force applied to the focus control rod 320 when the focus is controlled. Preferably, the focus control rod 320 is made of aluminum resistant to corrosion like the first rod fixing part 310.

The zoom control rod 420 has the same shape as the focus control rod 320 and is formed of the same material as that of the focus control rod 320. The body of the zoom control rod 420 is inserted into the second guide hole 120 formed in the outer surface of the housing 100 and screwed through the second waterproofing member 450. The end of the body of the zoom control rod 420 is fitted in the second rod fitting hole 418 formed in the second extended part 412 of the second rod fixing part 410.

The first waterproofing member 350 seals the first guide hole 110 formed in the housing 100 and is mounted in the first mounting groove 130 formed on the inner side of the housing 100 to perform waterproofing and dustproofing functions corresponding to the purpose of the present invention.

The first waterproofing member 350 includes a first contact cover 330 formed of rubber or silicon having an excellent adhering function and a first frame lever 340 made of a hard material such as plastic and combined with the first contact cover 330 to form a frame.

The first contact cover 330 has a round shape corresponding to the first mounting groove 130 formed on the inner side of the housing 100. The radius of curvature of the first contact cover 330 may be equal to or slightly greater than that of the first mounting groove 130.

The width of the cross section of the first contact cover 330 is wider than the first guide hole 110 formed in the first mounting groove 130 and smaller than or equal to the first mounting groove 130 such that the first contact cover 330 is mounted in the first mounting groove 130 while completely covering the first guide hole 110.

The cross section of the first contact cover 330 has a hollowed shape inside and part of the top of the cross section is cut. The hollowed shape of the first contact cover 330 corresponds to the shape of the cross section of the first frame lever 340 combined with the first contact cover 330, and thus the first frame lever 340 can be easily fitted in the first contact cover 330.

A screw combining part insertion hole 335 into which a screw combining part 344 included in the first frame lever 340 is fitted is formed at the center of the first contact cover 330.

The first contact cover 330 is required to completely cover the first guide hole 110 even when the focus control rod 320 moves to one end of the first guide hole 110 to control the focus of the imaging lens 210. Accordingly, the distance between the screw combining part insertion hole 335 and one end of the first contact cover 330 must be longer than at least the overall length of the first guide hole 110.

The first frame lever 340 is made of a hard material such as plastic and combined with the first contact cover 330 to form the frame of the first waterproofing member 350. Accordingly, the first frame lever 340 has a round shape having the same radius of curvature as that of the first contact cover 330. The shape of the cross section of the first frame lever 340 corresponds to the shape of the hollowed portion and the cut portion of the first contact cover 330.

']'-shaped cover parts 342 are respectively formed at both ends of the first frame lever 340 and support both ends and part of the top of the first contact cover 330. The cover parts 342 prevent the first contact cover 330 from being pushed or deformed due to friction between the first contact cover 330 and the first mounting groove 130 when the focus control rod 320 moves from side to side to control the focus of the imaging lens 210.

The screw combining part 344 is formed at the center of the first frame lever 340. The focus control rod 320 is screwed through the screw combining part 344 to be combined with the screw combining part 344. Parts of the screw combining part 344 are protruded from the top and bottom of the first frame lever 340 such that the screw thread of the screw combining part 344 can endure an external force generated when the focus control rod 320 is tightened. Particularly, the part protruded from the bottom of the first frame lever 340 is inserted in and combined with the screw combining part insertion hole 335 formed at the center of the first contact cover 330 to support the first contact cover 330 together with the cover parts 342.

The first waterproofing member 350 can be formed by assembling the first contact cover 330 and the first frame lever 340. If required, the first waterproofing member 350 can be manufactured in a body through injection molding.

The first waterproofing member 350 constructed as above is mounted in the first mounting groove 130 formed on the inner side of the housing 100, and then the focus control rod 320 is inserted into the first guide hole 110 formed in the housing 100, screwed through the screw combining part 344 of the first waterproofing member 350 and then fitted in the first rod fitting hole 318 formed in the first extended part 312 of the first rod fixing part 310.

The surveillance camera further includes a plurality of components such as an LED unit, a transparent window, a front cover, and a rear cover in addition to the aforementioned components. However, these components are known elements essentially used for the surveillance camera so that detailed explanations thereof are omitted.

Figure 5:
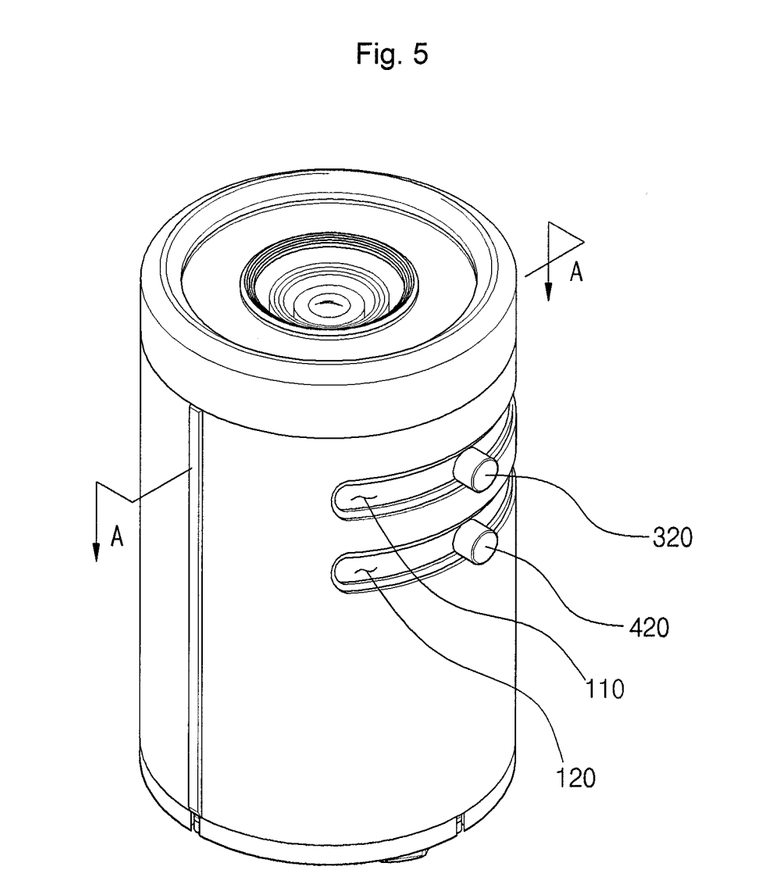
FIG. 5 illustrates the external structure of the surveillance camera having a lens controller waterproofing member, shown in FIG. 1.

FIG. 5 illustrates the external structure of the surveillance camera having a lens controller waterproofing member according to the present invention.

The operations of the first waterproofing member 350, the first rod fixing part 310 and the focus control rod 320 are described with reference to FIGS. 1 through 5.

The focus control rod 320 is rotated to one side if the focus control of the imaging lens 210 is required. Then, the first waterproofing member 350 screw-combined with the focus control rod 320 moves upward along the screw thread to be released from the first mounting groove 130 and become freely movable.

Then, if the focus control rod 320 is moved to one side or the other side of the first guide hole 110, the first rod fixing part 310 combined with the end of the focus control rod 320 is moved to rotate the focus controller 240 so as to control the focus of the imaging lens 210.

Upon the completion of the focus control of the imaging lens 210, when the focus control rod 320 is rotated to the other side, the first waterproofing member 350 is press-fitted in the first mounting groove 130 and combined with the first mounting groove 130 to seal the first guide hole 110.

The second waterproofing member 450, which has the same configuration as that of the first waterproofing member 350, includes a second contact cover 430 and a second frame lever 440. The second waterproofing member 450 is screw-combined with the zoom control rod 420 and fitted in the second mounting groove 140. The assembled structure and operation of the second waterproofing member 450 are identical to those of the first waterproofing member 350 so that detailed explanations thereof are omitted.

Figure 6:
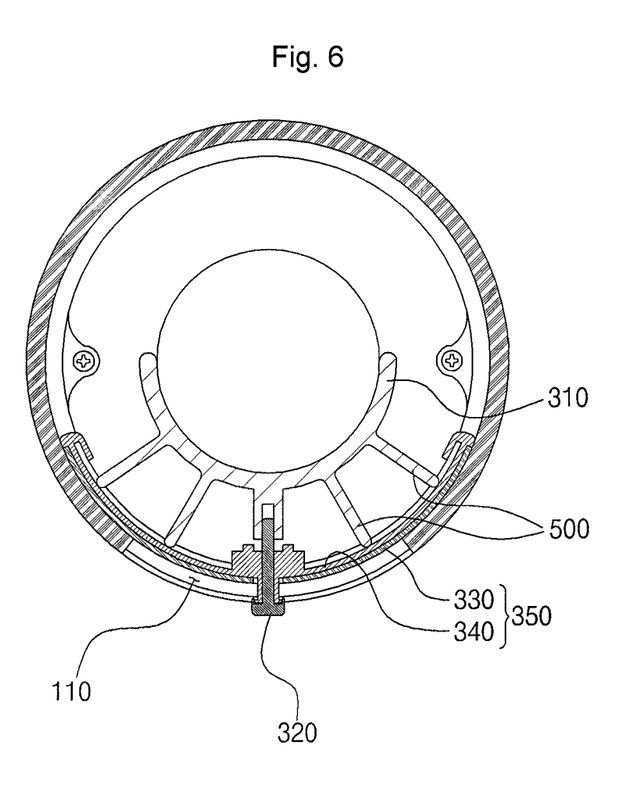
FIG. 6 is a cross-sectional view of a surveillance camera having a lens controller waterproofing member according to another embodiment of the present invention.

FIG. 6 is a cross-sectional view of a surveillance camera having a lens controller waterproofing member according to another embodiment of the present invention.

Referring to FIG. 6, in the surveillance camera having a lens controller waterproofing member, the first and second rod fixing parts 310 and 410 include a plurality of supporting brackets 500 supporting the first and second waterproofing members 350 and 450.

The supporting brackets 500 prevent parts of the first and second waterproofing members 350 and 350 from being detached due to imbalance of fixing pressure applied to the first and second waterproofing members 350 and 450.

The first and second waterproofing members 350 and 450 are press-fitted in the first and second mounting grooves 130 and 140 according to the focus control rod 320 and the zoom control rod 420 when the focus and zoom control of the lens unit 200 is completed.

Here, since the focus control rod 320 and the zoom control rod 420 intensively press only the centers of the waterproofing members 350 and 450, portions of the waterproofing members 350 and 450, which are close to both ends of the waterproofing members 350 and 450, may be separated from the mounting grooves 130 and 140.

When the waterproofing members 350 and 450 are separated from the mounting grooves 130 and 140, rainwater or dust infiltrates into the surveillance camera through the gap between the waterproofing members 350 and 450 and the mounting grooves 130 and 140 to corrode or damage the inner camera to thereby reduce the life of the surveillance camera.

The supporting brackets 500 slightly press the tops of the waterproofing members 350 and 450 when the waterproofing members 350 and 450 are being separated from the mounting grooves 130 and 140 such that the supporting brackets 500 do not obstruct the movement of the waterproofing members 350 and 450.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A surveillance camera with a lens controller waterproofing member, which has a focus controller and a zoom controller, comprising: a housing having a first guide hole and a second guide hole formed in the outer surface thereof; a first rod fixing part combined with the outer surface of the focus controller and including a first extended part with a first rod fitting hole, which is formed at the bottom thereof; a second rod fixing part combined with the outer surface of the zoom controller and including a second extended part with a second rod fitting hole, which is formed at the bottom thereof; a first waterproofing member sealing the first guide hole; a second waterproofing member sealing the second guide hole; a focus control rod having a body inserted into the first guide hole and screwed through the first waterproofing member and an end fitted in the first rod fitting hole formed in the first extended part of the first rod fixing part; and a zoom control rod having a body inserted into the second guide hole and screwed through the second waterproofing member and an end fitted in the second rod fitting hole formed in the second extended part of the second rod fixing part.

2. The surveillance camera of claim 1, wherein the housing includes a first mounting groove in which the first waterproofing member is mounted and a second mounting groove in which the second waterproofing member is mounted, which are formed on the inner face of the housing.

3. The surveillance camera of claim 1, wherein the first and second waterproofing members respectively comprise: contact covers in a round shape corresponding to the first and second mounting grooves formed on the inner face of the housing, the cross sections of the contact covers having a hollowed shape with the top partially cut, the contact covers having screw combining insertion holes 335 formed at the centers thereof; and frame levers having a cross section corresponding to the cross section of the contact covers and including ']'-shaped cover parts formed at both ends of the frame levers to support both ends and parts of the top of the contact covers and screw combining parts formed at the centers of the frame levers.

4. The surveillance camera of claim 3, wherein the contact covers are made of rubber or silicon and the frame levers are made of plastic.

5. The surveillance camera of claim 1, wherein the first and second rod fixing parts include a plurality of brackets supporting the first and second waterproofing members.

* * * * *